United States Patent [19]

Kahle et al.

[11] Patent Number: 5,049,876
[45] Date of Patent: Sep. 17, 1991

[54] DATA COMMUNICATION SYSTEM

[75] Inventors: Arno Kahle, Muehlheim; Heinz Daab, Darmstadt; Dieter Ehlers, Muehlheim; Bernd Scheler, Bad Orb, all of Fed. Rep. of Germany

[73] Assignee: Honeywell Inc., Minneapolis, Minn.

[21] Appl. No.: 377,472

[22] Filed: Jul. 10, 1989

[30] Foreign Application Priority Data

Jul. 16, 1988 [EP] European Pat. Off. ............ 88111460

[51] Int. Cl.$^5$ ...................... H04Q 9/00; H04L 11/16
[52] U.S. Cl. ......................... 340/825.57; 340/325.62; 340/310 R; 359/152
[58] Field of Search ...................... 340/825.05, 825.57, 340/825.61, 825.62, 310 R, 310 A; 455/606, 613; 307/117, 311; 370/1, 4

[56] References Cited

U.S. PATENT DOCUMENTS 3,794,888  2/1974  Hisano ........................... 340/825.62
4,176,401 11/1979  Lonberget ...................... 455/613
4,320,388  3/1982  McCarthy et al. ............ 340/825.62
4,499,463  2/1985  Jacquel .......................... 340/825.57
4,709,233 11/1987  Duval ............................ 340/825.57

FOREIGN PATENT DOCUMENTS 1420443 11/1965 France ........................... 340/825.57

Primary Examiner—Donald J. Yusko
Assistant Examiner—Eric O. Pudpud
Attorney, Agent, or Firm—Arthur A. Sapelli; D. J. Lenkszus; A. Medved

[57] ABSTRACT

A dialogue system uses a three wire bus connecting a central station with a plurality of substations with two of the wires carrying an AC supply voltage and a third one of the wires carrying data by means of a closed loop of the AC carrying wires and the third wire. The central station uses a series connection of a data transmitter and a data receiver with the third data wire and each substation includes a data receiver in series with the data wire and a data transmitter between the data wire and both AC wires.

11 Claims, 4 Drawing Sheets

DATA COMMUNICATION SYSTEM

BACKGROUND OF THE INVENTION

1. Field of the Invention

The present invention relates to communication systems. More specifically, the present invention is directed to a bus communication system between a central station and a plurality of remote substations.

2. Description of the Prior Art

A known communication or dialogue system uses a two-wire line as a bus between a central station and a plurality of substations, wherein within the central station as well as within the substations transmitting and receiving devices are connected in parallel between both wires. In the known system, two voltage sources of different polarity are used in order to transmit data in both directions, whereat the transmitting and receiving circuits, respectively, are decoupled from each other by mean of accordingly biased diodes. The information transfer is made by modulating the currents flowing in both directions. The present invention improves this system in such a way that by simple means a data transfer is possible between the stations and that a current supply of the substations and a control of final control elements within the substations is possible.

SUMMARY OF THE INVENTION

An object of the present invention is to provide an improved dialogue system between a central station and a plurality of remote substations.

In accomplishing this and other objects, there has been provided, in accordance with the present invention, a dialogue system between a central station and a plurality of remote substations comprising a three wire bus connected therebetween with two of the wires carrying an AC supply voltage and a third one of the wires carrying data by means of a closed loop of the AC carrying wires and the third wire.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
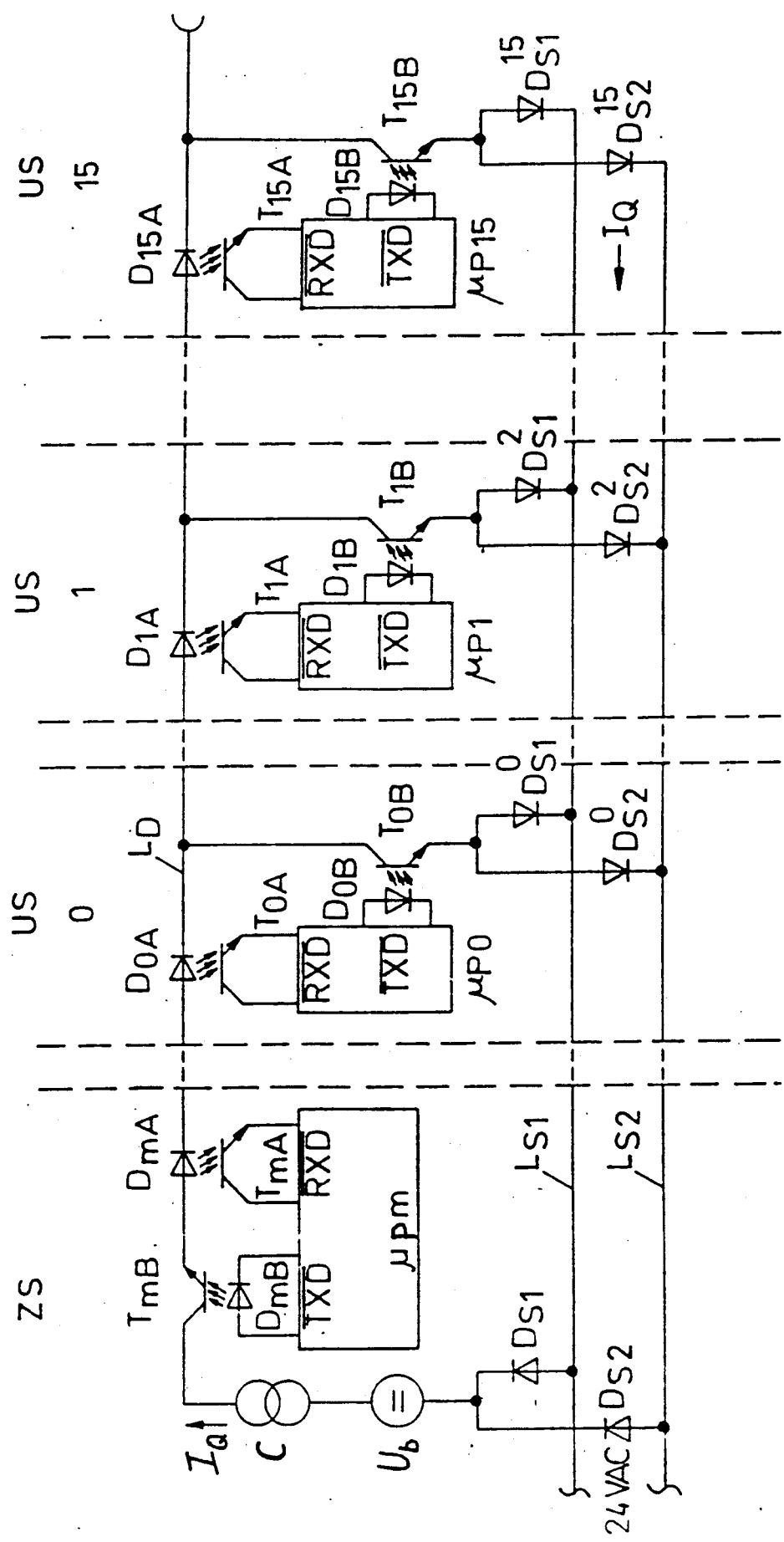
FIG. 1 is a schematic of an embodiment of a dialogue system embodying an example of the present invention.

Referring to FIG. 1, the dialogue system embodying the present invention consists of a central station ZS and a plurality of substations, e.g., sixteen substations US0 to US15, which are connected with each other by means of a bus consisting of three wires LD, LS1 and LS2. The wire LD serves to transfer data between the central station ZS and the substations US0 to US15, and the wires LS1 and LS2 conduct an AC voltage, e.g., 24V, which AC voltage provides the supply voltage of the substations and which AC wires together with the data wire LD form a closed loop circuit line for the data transfer. Furthermore, this AC voltage may be used for driving final control elements (not shown). Diodes DS1 to DS1$^{15}$ as well as diodes DS2 and DS2$^{15}$ are used during each respective half wave of the AC voltage to close the loop line for the data transfer.

The central station ZS comprises a constant voltage source $U_b$ connected in series with a current source C. The constant current $I_Q$ the current source C is modulated according to a bit pattern by means of transmitting devices within the central station ZS as well as within the substations US. The transmitting device within the central station ZS consists of an opto-coupler which comprises a light emitting diode DmB and a phototransistor TmB, whereat the phototransistor TmB with its main current path is serially connected into the data wire LD, and the light emitting diode DmB is controlled by a microprocessor $\mu$Pm within the central station ZS. The bit pattern transmitted by the central station may be received by receiving devices within the substations, whereat those devices also are configured as opto-couplers comprising a light-emitting diode D0A to D15A series within the data wire LD and a phototransistor T0A to T15A. These phototransistors each are connected to the receiving input RxD of a microprocessor $\mu$uP0 to $\mu$P15 within respective ones of each substation US0 to US15.

Each substation US0 to US15 also comprises a transmitting device configured as an opto-coupler which comprises light-emitting diodes D0B to D15B and phototransistors T0B to T15B. The light-emitting diodes are connected to the data output TxD of respective ones of the microprocessors $\mu$P0 to $\mu$P15, and the phototransistors T0B to T15B each connect the data wire LD to the wires LS1 and LS2, respectively, by means of diodes DS1 and DS2. The substations are able to transmit information by means of those transmitting devices to the central station by a modulation of the current flowing through the diode shunt circuit. To this end the transmitting device DmB, TmB within the central station ZS must be closed, i.e., conductive, in order that a receiving device connected in series thereto and consisting of a further opto-coupler may sense the transmitted bit pattern and may feed this bit pattern to the data input RxD of the microprocessor $\mu$Pm within the central station.

The dialogue system shown in FIG. 1 operates in such a way that the transmitting device T15B within the last substation US15 initially is closed so that the central station ZS is able to modulate the current flowing through all substations. In the event where the central station is addressing a substation and requests data from this substation, the phototransistor T15B in the last substation US15 within the chain is switched-off and the randomly located and addressed module USx, after being addressed, modulates the current supplied by the central station by timely closing its transmitting device TxB, whereat the receiving device of the central station receives the transmitted information. The phototransistor TmB within the central station herewith is concurrently closed. In the event where a randomly located substation USx transmits any data, all substations having a higher address are not able to read the transmitted data.

In the present dialogue system, up to sixteen substations are connected to the central station. The allocation of addresses to the substations is done automatically during initialization of the system in the sequence in which the substations are connected to the bus. This prevents, at a low expenditure of installation time, a wrong manual addressing and saves expenditure with respect to hardware. This address allocation is further described hereinafter.

Figure 2:
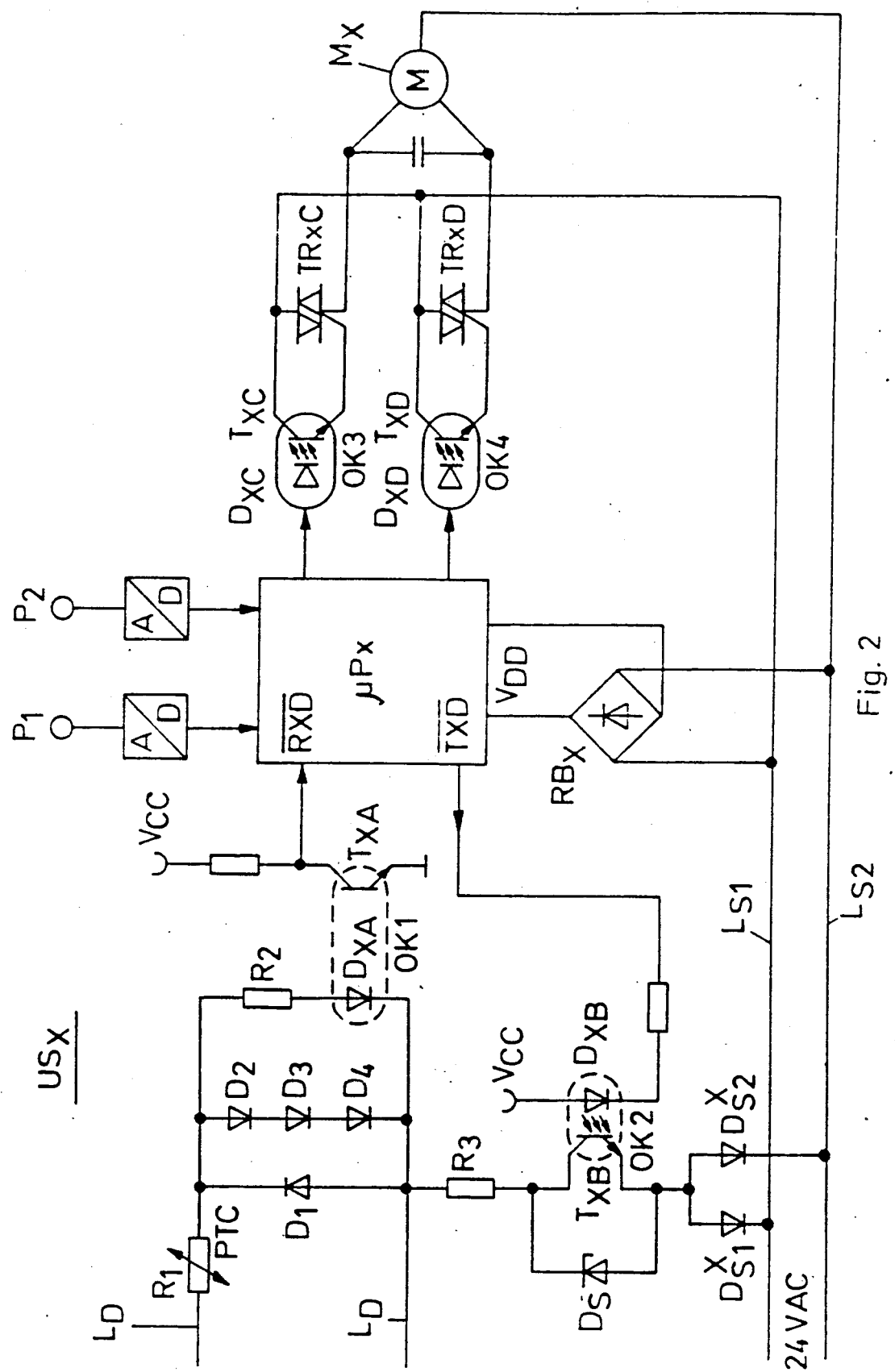
FIG. 2 is a schematic illustration of a substation for use in the system shown in FIG. 1.

FIG. 2 shows the detailed schematic configuration of a typical substation USx. This substation may be addressed via the data wire LD, whereat a first opto-coupler OK1 consisting of a light-emitting diode DxA and a photo-transistor TxA senses the address signal and applies this signal to the data input RxD of the microprocessor μPx. Herewith the microprocessor μPx is supplied with a voltage by means of a rectifier bridge RBx, which is connected to the AC voltage lines LS1 and LS2. The microprocessor μPx further may be supplied via the opto-coupler OK1 with a coded control information from the central station due to which information it outputs a control signal to a final control element, e.g., motor Mx. The output of the control signal is also made via opto-couplers OK3 and OK4 which comprise light-emitting diodes DxC, DxD and phototransistors TxC, TxD and which control triacs TRxC and TRxD for the respective clockwise and counterclockwise running of the motor Mx.

Furthermore, the substation USx may transfer information to the central station, e.g., by applying analog signals measured at measuring points P1 and P2 after analog/digital conversion (A/D) to the microprocessor μPx whereupon this microprocessor delivers a coded signal at its data output TxB, with which an opto-coupler OK2 consisting of the light-emitting diode DxB and the phototransistor TxB is controlled and whereupon the DC current signal flowing from the data wire LD to the AC voltage lines LS1 and LS2, respectively, is accordingly modulated.

The final control element given by the motor Mx and the measuring points P1, P2 only serve as illustrative examples; each substation can include a plurality of analog and digital inputs and outputs, e.g., sixteen analog and sixteen digital inputs and outputs. The components further shown in FIG. 2, e.g., the resistors R1 to R3 and the diodes D1 to D5, belong to a protection circuit and do not pertain the present invention. The microprocessors are eight bit microprocessors. Since, however, analog measured values are coded by twelve bits, i.e., duodecimal, the digital transfer of the measured value is made by two data bytes of eight bits plus a check-sum-byte and second data byte. The addressing of the substations is made by a control byte delivered by the central station ZS with its most significant bit being set to "1" and with the four lowest significant bits forming a coded address of the sixteen substations. Further details with respect to the bus protocol are not a part of the present invention.

Figure 3:
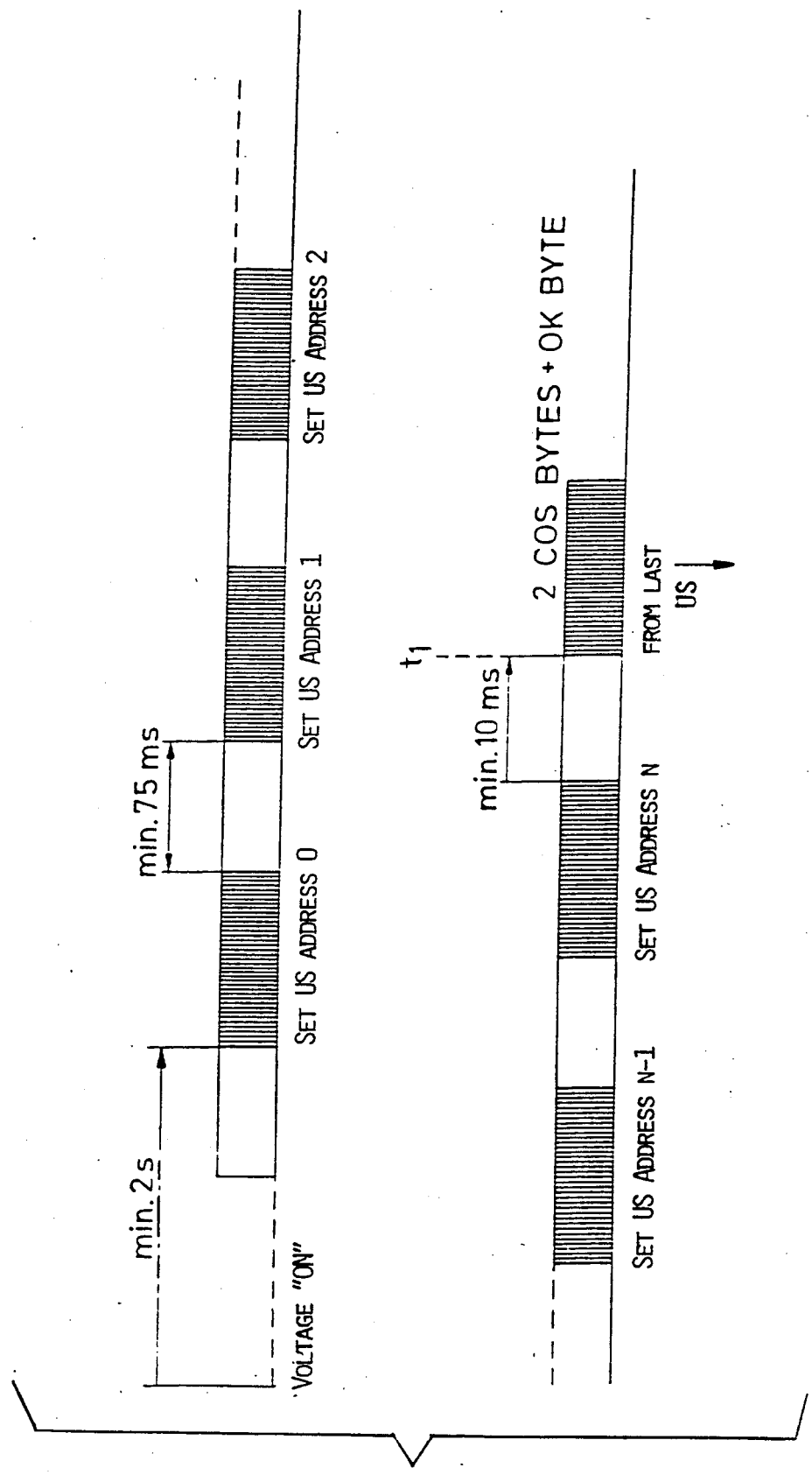
FIG. 3 is a waveshape diagram showing the bus initialization of the present invention.

With respect to FIG. 3, the bus initialization is as follows. After switching-on of the voltage, all microprocessors within the substations generate a reset signal, whereupon all transmitting transistor T0B to T15B are switched-on. Thereupon, the central station ZS sends a command "Set US Address 0". Only the substation US0, which is located closest to the vicinity of the central station ZS, recognizes this command. This substation makes the address of this command to its own address, and it switches-off its transmitting transistor T0B 10 ms after the second stop bit of the central station ZS command. This results in a current now flowing through the next substation US1.

In the event where a substation USx has switched-off its transmitting transistor TxB and does not further sense a current with its receiving diode DxA, this substation USx knows that it is the last station on the bus. In this event it has to provide the frame for five bytes and it has to send an acknowledgment signal to the central station ZS with the trailing edge of the current interruption as a start bit. Thereupon this substation takes over the control of the bus. If it is not the last substation on the bus, then the central station ZS, after it has transmitted the command "Set US Address x", waits 15 ms for a message. In the event where the central station does not receive the above-mentioned acknowledgment during this time, it emits, after a further 60 ms, the command "Set US Address X+1". This addressing is continued until the last substation within the chain of substations is addressed.

Figure 4:
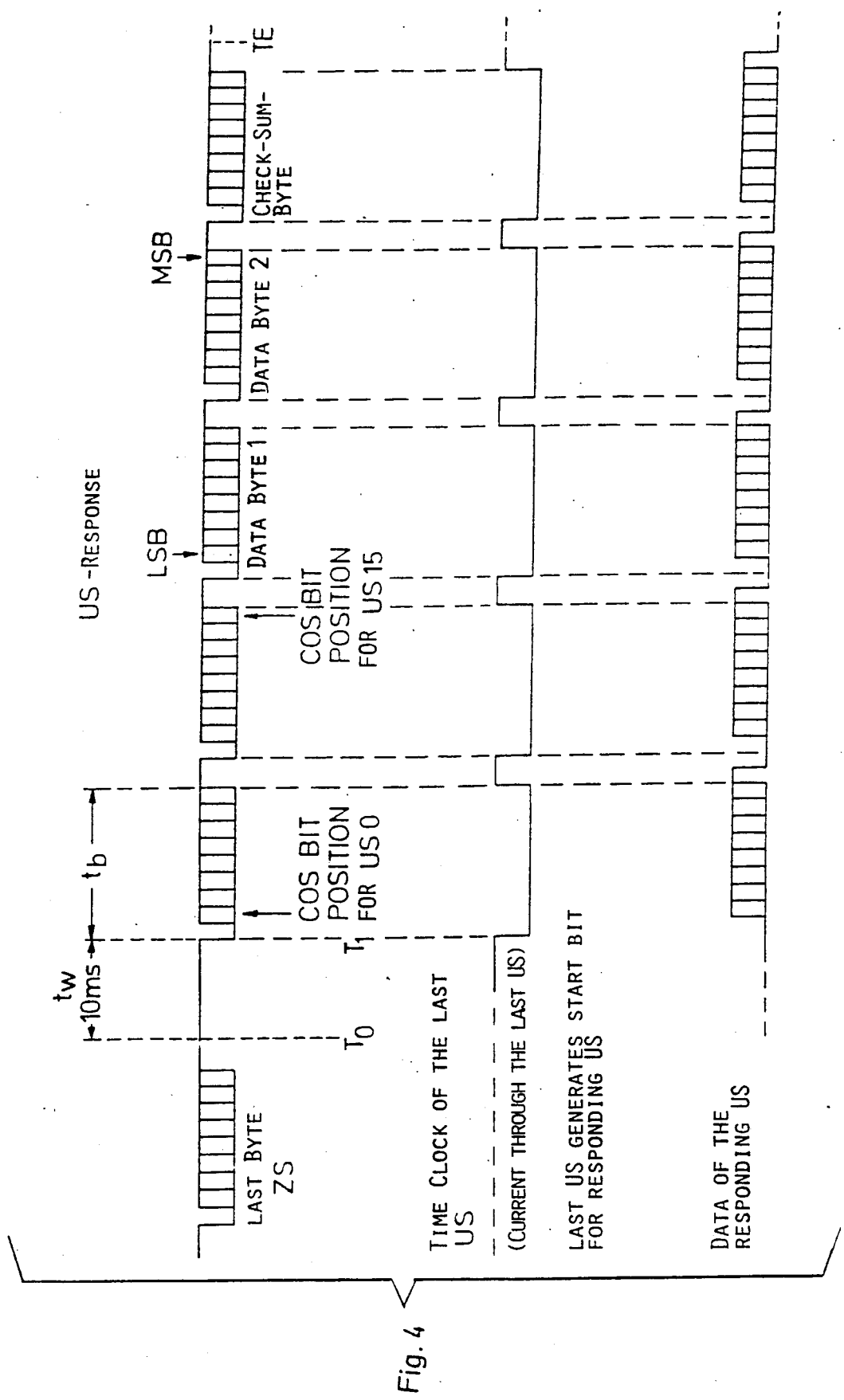
FIG. 4 is a bus clock time diagram used in the present invention.

FIG. 4 shows the time clock diagram of the bus as viewed from the central station ZS. Herewith it is again noted that the last substation in the bus always takes over the bus control, switches-off the transmitting transistor TxB after a command of the central station ZS to a substation in front of it and generates five start bits by switching-on the transmitting transistor. This allows the requested substation to send five data bytes at maximum. The first two bytes are change-of-state bytes (COS -bytes), whereat the substations US0 to US7 are allowed to set a bit at a suitable location within the first COS byte in order to indicate the address number of the requesting substation to the central station. In the same manner, the substations US8 to US15 are allowed to set a bit at a suitable location within the second COS-byte in order to indicate the address number of the requesting substation to the central station. Following after the two COS-bytes, the requested data are sent by two data bytes and a check-sum-byte.

According to FIG. 4, the substation (the last within the chain) taking over control of the bus after a request by the central station ZS which ends after the second stop bit in the point of time T0 waits during the waiting time $t_w$ of 10 ms and then opens the current loop given by the bus for the duration $t_b$ of nine bits. This results in the trailing edge at the point of time T1. After the occurrence of this trailing edge the substations US0 to US7 are allowed to set their according COS bit within the first COS byte. After nine bits that last substation within the chain switches-off the bus for the duration of two bit (two stop bits). Subsequently, this substation again switches-on the bus for the duration of nine bits, whereupon the substations US8 to US15 may indicate to the central station ZS by setting a COS bit at a suitable location within the second COS byte which substation requests service. In this way, the last substation within the chain allows the generation of five bytes by each addressed substation. Those five bytes comprise two COS bytes, two data bytes and a check-sum-byte. Each byte has a leading start bit and each byte is followed by two stop bits.

Accordingly, it may be seen that there has been provided, in accordance with the present invention, an improved dialogue system between a central station and a plurality of remote substations.

The embodiments of the present invention in which an exclusive property or privilege is claimed are defined as follows:

1. A data communication system, comprising:
  (a) a first bus;
  (b) a second bus;
  (c) a central station, which includes:

(i) current source means, connected between said first and second bus, for providing a current onto said first bus;
(ii) first transmitter means, connected in a series arrangement with said first bus, for transmitting information onto said first bus;
(iii) first receiver means, connected in a series arrangement with said first bus, for receiving information on said first bus; and
(iv) first processor means, operatively connected to said first transmitter means and to said first receiver means, for processing information to be transmitted and received onto said first bus; and (d) at least one substation, wherein each substation includes:
(i) second receiver means for receiving information transmitted from said central station, each second receiver means of each substation being connected in a series arrangement with said first bus;
(ii) second transmitter means for transmitting information to said central station, each second transmitter means of each substation being connected in a parallel arrangement between said first bus and said second bus; and
(iii) second processor means, each second processor means of each substation being operatively connected to its respective second receiver means and second transmitter means, for processing predetermined information received and transmitted onto said first bus, wherein said current from said current source is modulated according to a bit pattern of information by said first and second transmitter means.

2. A data communication system according to claim 1, wherein said second bus comprises:
a first and second wire for coupling an AC voltage to each of said substation thereby providing a supply voltage to each substation.

3. A data communication system according to claim 2, wherein said second bus provides a closed loop for the information transmitted on said first bus to each of the substations.

4. A data communication system according to claim 1 wherein said current source means of said central station is a constant current source means.

5. A data communication system according to claim 4, wherein said first transmitter means comprises:
an opto-coupler including;
(a) a light emitting diode connected to an output terminal of the first processor means; and
(b) a phototransistor having a main current path serially connected with said first bus.

6. A data communication system according to claim 4, wherein each of said second transmitter means comprises:
an opto-coupler including;
(a) a light emitting diode, connected to a corresponding output terminal of the second processor means; and
(b) a phototransistor having a main current path connected between the first and second bus, such that each phototransistor of each transmitter means is connected in a parallel arrangement between said first and second bus.

7. A data communication system according to claim 5, wherein each of said second transmitter means comprises:
an opto-coupler including;
(a) a light emitting diode, connected to a corresponding output terminal of the second processor means; and
(b) a phototransistor having a main current path connected between the first and second bus, such that each phototransistor of each transmitter means is connected in a parallel arrangement between said first and second bus.

8. A data communication system according to claim 4, wherein said first receiver means comprises:
an opto-coupler including,
(a) a light emitting diode connected serially with said first bus; and
(b) a phototransistor having a main current path connected to a receiver terminal of said first processor means.

9. A data communication system according to claim 7, wherein said first receiver means comprises:
an opto-coupler including,
(a) a light emitting diode connected serially with said first bus; and
(b) a phototransistor having a main current path connected to a receiver terminal of said first processor means.

10. A data processing system according to claim 9, wherein each of said second receiver means comprises;
an opto-coupler including,
(a) a light emitting diode connected serially with said first bus; and
(b) a phototransistor having a main current path connected to a receiver terminal of a corresponding second processor means.

11. A data processing system according to claim 4, wherein each of said second receiver means comprises;
an opto-coupler including,
(a) a light emitting diode connected serially with said first bus; and
(b) a phototransistor having a main current path connected to a receiver terminal of a corresponding second processor means.

* * * * *